United States Patent
Domitrovich et al.

(10) Patent No.: US 7,633,736 B2
(45) Date of Patent: Dec. 15, 2009

(54) CIRCUIT INTERRUPTER INCLUDING NONVOLATILE MEMORY STORING CAUSE-OF-TRIP INFORMATION

(75) Inventors: Thomas A. Domitrovich, Aliquippa, PA (US); Robert T. Elms, Monroeville, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 441 days.

(21) Appl. No.: 11/473,687

(22) Filed: Jun. 23, 2006

(65) Prior Publication Data

US 2007/0297113 A1  Dec. 27, 2007

(51) Int. Cl.
*H01H 73/00* (2006.01)
*H02H 3/00* (2006.01)
*H02H 7/26* (2006.01)
*H02H 9/08* (2006.01)

(52) U.S. Cl. ............... 361/115; 361/42; 361/44; 361/65; 361/67

(58) Field of Classification Search .......... 361/42, 361/64, 115, 44, 65, 67
See application file for complete search history.

(56) References Cited

U.S. PATENT DOCUMENTS

| | | | |
|---|---|---|---|
| 4,642,733 A | 2/1987 | Schacht | |
| 5,038,246 A | 8/1991 | Durivage, III | |
| 5,220,479 A | 6/1993 | Fraisse | |
| 5,244,006 A | 9/1993 | Pettesch | |
| 5,260,676 A | 11/1993 | Patel et al. | |
| 5,293,522 A | 3/1994 | Fello et al. | |
| 5,351,038 A | 9/1994 | Goldberg | |
| 5,546,266 A | 8/1996 | Mackenzie et al. | |
| 5,691,869 A | 11/1997 | Engel et al. | |
| 5,847,913 A | 12/1998 | Turner et al. | |
| 5,875,087 A | 2/1999 | Spencer et al. | |
| 5,926,355 A | 7/1999 | Matsko et al. | |
| 5,982,593 A | 11/1999 | Kimblin et al. | |
| 6,018,451 A | 1/2000 | Lyke et al. | |
| 6,122,157 A | 9/2000 | Gerlach | |
| 6,212,049 B1 | 4/2001 | Spencer et al. | |
| 6,222,714 B1 | 4/2001 | Hoffman | |
| 6,239,677 B1 | 5/2001 | Ramakrishnan et al. | |
| 6,356,426 B1 * | 3/2002 | Dougherty | 361/102 |
| 6,453,260 B1 * | 9/2002 | Prough | 702/132 |
| 6,552,884 B2 | 4/2003 | Kim et al. | |
| 6,615,160 B1 * | 9/2003 | Quinnett et al. | 702/185 |
| 7,030,769 B2 | 4/2006 | Miller | |
| 7,454,298 B2 * | 11/2008 | Roal et al. | 702/58 |
| 2003/0202304 A1 | 10/2003 | Canova et al. | |
| 2006/0018060 A1 | 1/2006 | Elms et al. | |

FOREIGN PATENT DOCUMENTS

JP  05300617 A  11/1993

* cited by examiner

*Primary Examiner*—Fritz M. Fleming
*Assistant Examiner*—Lucy Thomas
(74) *Attorney, Agent, or Firm*—Martin J. Moran

(57) ABSTRACT

A circuit breaker includes separable contacts, an operating mechanism structured to open and close the separable contacts, and a trip mechanism. The trip mechanism includes a sensor structured to sense current flowing through the separable contacts, a processor cooperating with the sensor to determine a plurality of different trip conditions responsive to the sensed current, a nonvolatile memory operatively associated with the processor, and a trip actuator cooperating with the processor and the operating mechanism to trip open the separable contacts responsive to one of the different trip conditions from the processor. The processor is structured to save in and retrieve from the nonvolatile memory cause-of-trip information for the different trip conditions including the one of the different trip conditions.

20 Claims, 6 Drawing Sheets

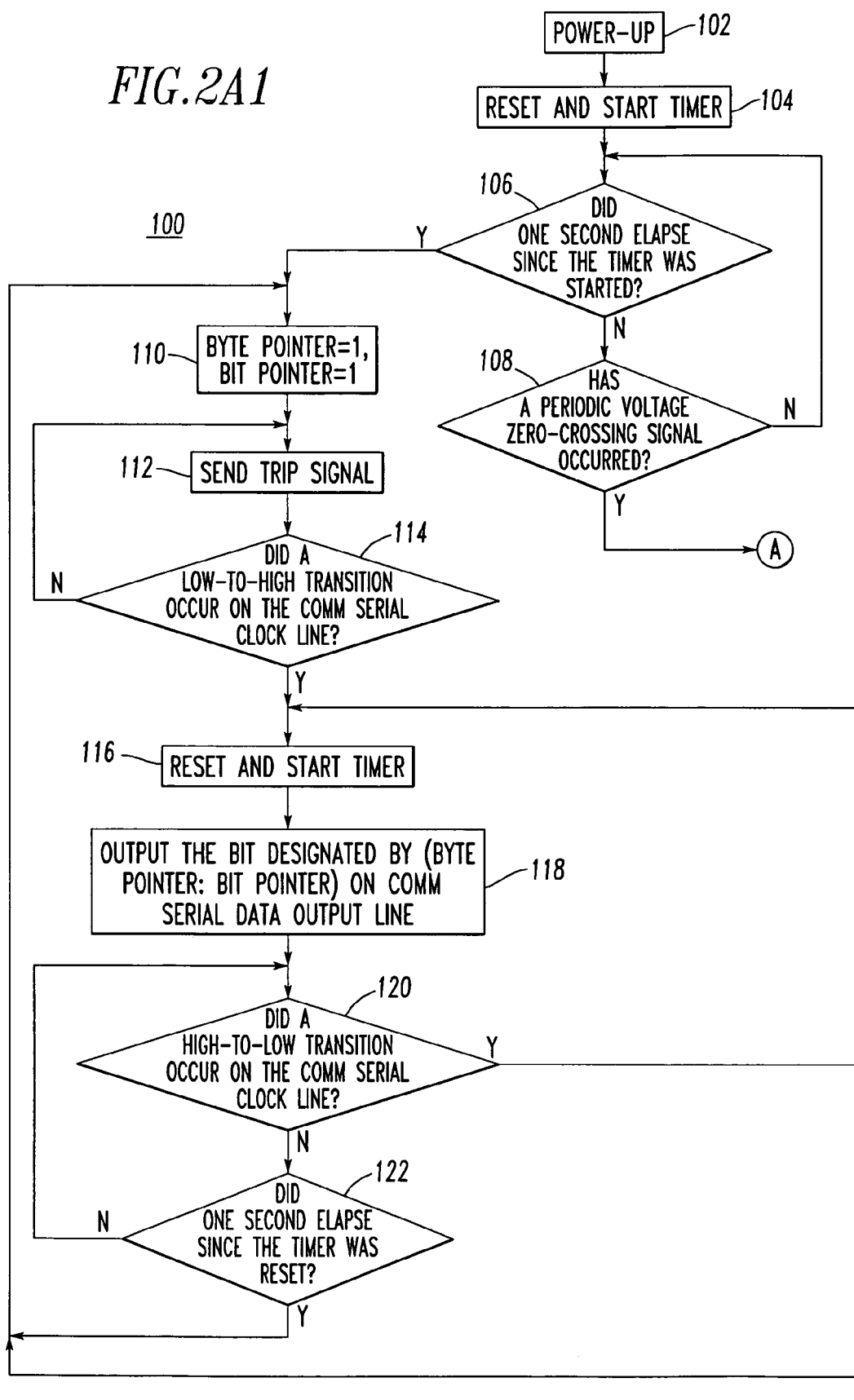
FIG.2A1

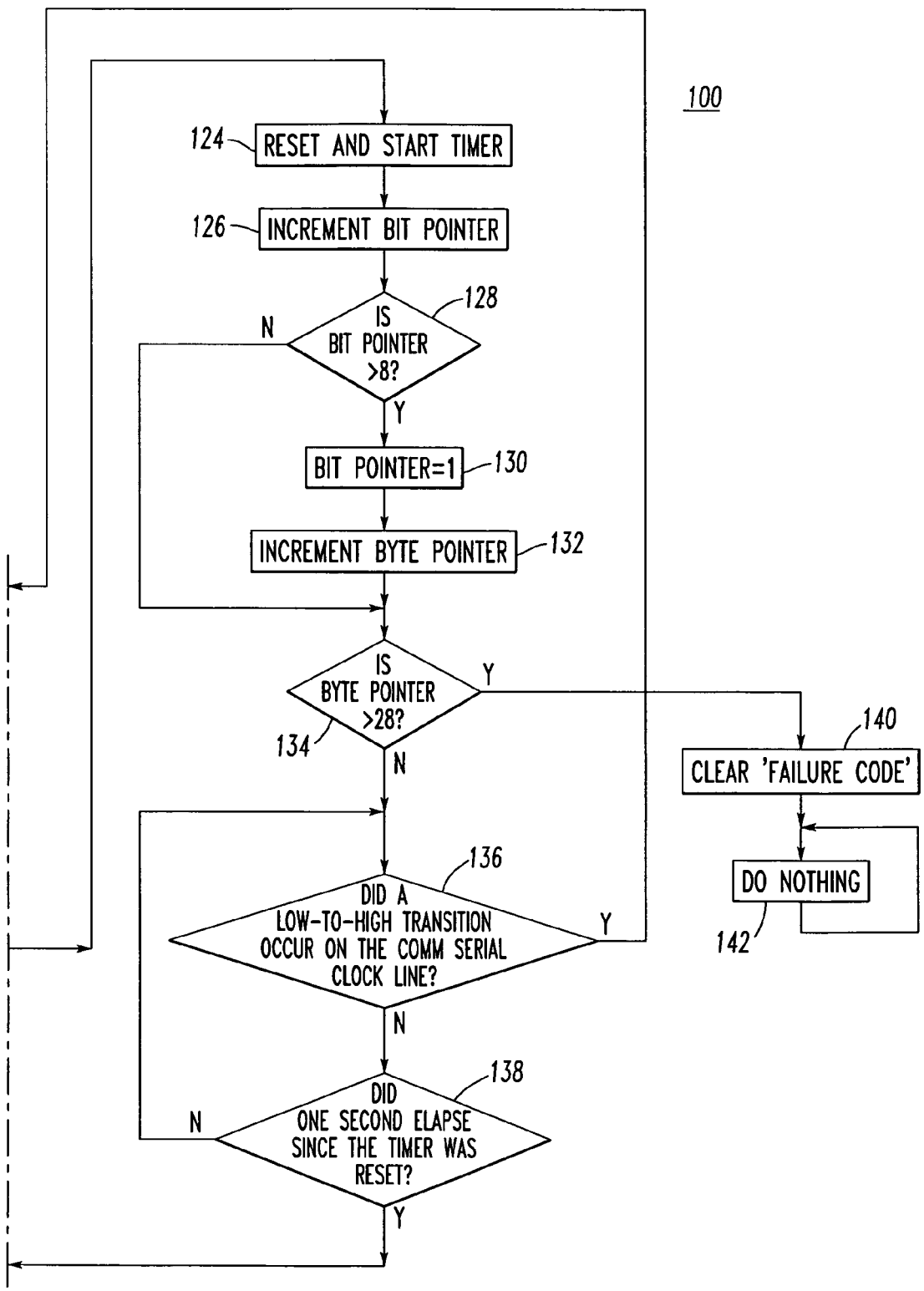
FIG.2A2

CIRCUIT INTERRUPTER INCLUDING NONVOLATILE MEMORY STORING CAUSE-OF-TRIP INFORMATION

BACKGROUND OF THE INVENTION

1. Field of the Invention

This invention pertains generally to circuit interrupters and, more particularly, to circuit breakers including a trip mechanism responsive to a plurality of different trip conditions.

2. Background Information

Circuit interrupters include, for example, circuit breakers, contactors, motor starters, motor controllers, other load controllers and receptacles having a trip mechanism. Circuit breakers are generally old and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal which is heated and bends in response to a persistent overcurrent condition. The bimetal, in turn, unlatches a spring powered operating mechanism which opens the separable contacts of the circuit breaker to interrupt current flow in the protected power system. An armature, which is attracted by the sizable magnetic forces generated by a short circuit or fault, also unlatches, or trips, the operating mechanism.

In many applications, the miniature circuit breaker also provides ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device. See, for example, U.S. Pat. Nos. 5,260,676; 5,293,522; and 5,982,593.

Also, in many applications, miniature circuit breakers provide arc fault protection. See, for example, U.S. Pat. Nos. 5,224,006; 5,691,869; and 5,982,593.

When the circuit breaker detects a potentially hazardous fault condition, it must open the protected power circuit as quickly as possible in order to interrupt the fault condition. There is a delay from the time that the circuit breaker electronic circuit issues a trip request to the time when the separable contacts actually sufficiently part and interrupt the fault condition. For example, this delay may be in the order of about one-half of a 60 Hz electrical cycle in a miniature circuit breaker. Also, when the separable contacts open, the circuit breaker electronic circuit is typically disconnected from its power source. There is typically sufficient energy storage in the circuit breaker power supply to sustain operation of the electronic circuit for about one-half of the 60 Hz electrical cycle after the separable contacts open.

Typically, faulty residential circuit breakers are returned to the manufacturer without any information regarding the current level, the cause-of-trip or the count of trips. For example, known returned arc fault/ground fault circuit breakers provide no information to the manufacturer as to whether the circuit breaker tripped for arc fault or ground fault conditions, and provide no information as to the current level at the time of tripping.

Accordingly, there is room for improvement in circuit interrupters and circuit breakers.

SUMMARY OF THE INVENTION

This need and others are met by embodiments of the invention, which provide a circuit interrupter that stores in a nonvolatile memory information regarding, for example, the current level, the cause-of-trip and the count of trips for use in diagnosing a fault or failure of the circuit interrupter.

In accordance with one aspect of the invention, a circuit interrupter comprises: separable contacts; an operating mechanism structured to open and close the separable contacts; and a trip mechanism comprising: a sensor structured to sense current flowing through the separable contacts, a processor cooperating with the sensor to determine a plurality of different trip conditions responsive to the sensed current, a nonvolatile memory operatively associated with the processor, and a trip actuator cooperating with the processor and the operating mechanism to trip open the separable contacts responsive to one of the different trip conditions from the processor, wherein the processor is structured to save in and retrieve from the nonvolatile memory cause-of-trip information for the different trip conditions including the one of the different trip conditions.

The different trip conditions may include at least some of an arc fault trip condition, a ground fault trip condition and an overload trip condition; and the cause-of-trip information may include one of an arc fault trip code corresponding to the arc fault trip condition, a ground fault trip code corresponding to the ground fault trip condition, and an overload trip code corresponding to the overload trip condition.

The processor may determine a trip current corresponding to one of the arc fault trip condition, the ground fault trip condition and the overload trip condition; and the processor may be further structured to save in and retrieve from the nonvolatile memory the trip current as part of the cause-of-trip information.

The cause-of-trip information may further include a count of arc fault trips corresponding to the arc fault trip condition, a count of ground fault trips corresponding to the ground fault trip condition, and a count of overload trips corresponding to the overload trip condition.

After power-up, the processor may be structured to increment one of a count of arc fault trips, a count of ground fault trips and a count of overload trips based upon one of the arc fault trip code, the ground fault trip code and the overload trip code.

The different trip conditions may include a test trip condition, an arc fault trip condition, a ground fault trip condition, a short delay trip condition and an overload trip condition; the processor may determine a trip corresponding to one of the test trip condition, the arc fault trip condition, the ground fault trip condition, the short delay trip condition and the overload trip condition; and the cause-of-trip information may further include a count of trips for each of the test trip condition, the arc fault trip condition, the ground fault trip condition, the short delay trip condition and the overload trip condition.

As another aspect of the invention, a circuit breaker comprises: separable contacts; an operating mechanism structured to open and close the separable contacts; and a trip mechanism comprising: a first sensor structured to sense current flowing through the separable contacts, a second sensor structured to sense a voltage operatively associated with the separable contacts, a processor cooperating with the first sensor to determine a plurality of different trip conditions responsive to the sensed current, a nonvolatile memory operatively associated with the processor, and a trip actuator cooperating with the processor and the operating mechanism to trip open the separable contacts responsive to one of the different trip conditions from the processor, wherein the processor is structured to save in and retrieve from the nonvolatile memory cause-of-trip information for the different trip conditions including the one of the different trip conditions.

The processor may include a first power supply voltage input, a second power supply voltage input, a serial data output and a serial clock input; and the trip mechanism may further comprise a first terminal corresponding to the first power supply voltage input, a second terminal corresponding to the second power supply voltage input, a third terminal corresponding to the serial data output and a fourth terminal corresponding to the serial clock input.

The processor may be structured to input the voltage from the second sensor and receive a periodic signal therefrom; and the processor may be further structured to retrieve the cause-of-trip information from the nonvolatile memory when the processor is powered for a predetermined time without receipt of the periodic signal.

BRIEF DESCRIPTION OF THE DRAWINGS

A full understanding of the invention can be gained from the following description of the preferred embodiments when read in conjunction with the accompanying drawings in which:

FIGS. 2A1, 2A2, 2B and 2C are flowcharts of a routine executed by the processor of FIG. 1.

DESCRIPTION OF THE PREFERRED EMBODIMENTS

The invention is described in association with a miniature, residential circuit breaker, although the invention is applicable to a wide range of circuit interrupters.

Figure 1:
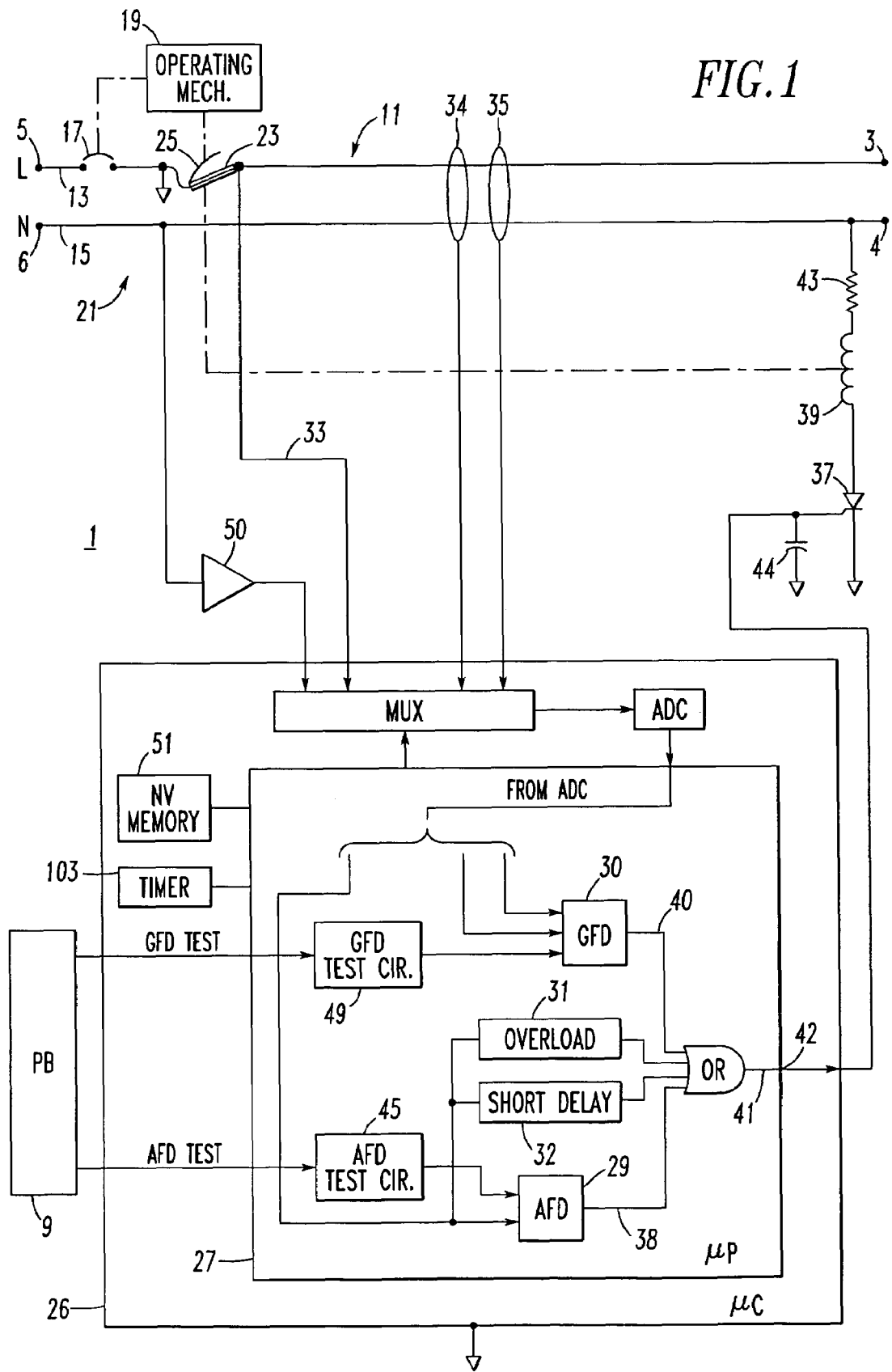
FIG. 1 is a block diagram in schematic form of a circuit breaker in accordance with an embodiment of the invention.

Referring to FIG. 1, a circuit interrupter (e.g., without limitation, a miniature, residential circuit breaker 1) is connected in an electric power system 11 which has a line conductor 13 and a neutral conductor 15. The circuit breaker 1 includes a load terminal 3, a load neutral terminal 4, a line terminal 5, a neutral terminal 6, and separable contacts 17 which are electrically connected in series with the line conductor 13 between the line terminal 5 and the load terminal 3. The separable contacts 17 are opened and closed by an operating mechanism 19. In addition to being operated manually by a handle (not shown), the operating mechanism 19 can also be actuated to open the separable contacts 17 by a trip assembly 21 in response to predetermined current conditions. The trip assembly 21 includes the conventional bimetal 23 which is heated by persistent overcurrents and bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The trip assembly 21 further includes a processor (e.g., without limitation, microcomputer (µC) 26 having a microprocessor (µP) 27 cooperating with the bimetal 23 to determine a plurality of different trip conditions responsive to current sensed from the voltage across the bimetal 23, and a nonvolatile (NV) memory 51 operatively associated with µP 27. The µP 27 of the trip assembly 21 implements a number of different fault detection functions, such as, for example and without limitation, an arc fault detector (AFD) 29, a ground fault detector (GFD) 30, a overload detector 31 and a short delay detector 32. Alternatively, any number of these or other different fault detection functions may be implemented by different circuit structures other than or in cooperation with the µP 27.

The AFD 29 may be, for instance, of the type which detects the step increases in current which occur each time an arc is struck, although other types of arc fault detectors could also be used. Suitable arc fault detectors are disclosed, for instance, in U.S. Pat. No. 5,224,006, with a preferred type described in U.S. Pat. No. 5,691,869, which is hereby incorporated by reference. The AFD 29 senses the current in the electrical system 11 by monitoring the voltage across the bimetal 23 (or other suitable current sensor (not shown)) through the lead 33 to sense an arc fault current condition. As described in U.S. Pat. No. 5,691,869, the AFD 29 includes circuitry which generates a pulse in response to each step change in current. The pulse signal is integrated with the result of the integration being attenuated over time. When the time attenuated accumulation of the pulses reaches a selected level, the AFD 29 generates at its output an arc fault trip signal 38 which is active in response to the arc fault. In turn, the signal 38 is combined with the output trip signal 40 of the GFD 30 and is employed to actuate the operating mechanism 19 and open the separable contacts 17 in response to the fault.

The GFD 30 may be of the well known dormant oscillator type in which case it utilizes a pair of sensing coils 34,35 to detect both line-to-ground and neutral-to-ground fault current conditions. If the AFD 29 detects an arc fault in the electric power system 11, the trip signal 38 is generated which, through the SP 27, turns on a switch such as the silicon controlled rectifier (SCR) 37 to energize a trip solenoid 39. When the GFD 30 detects a ground fault, it generates at its output a ground fault trip signal 40 which is active in response to the ground fault. The ground fault trip signal 40 is "ORed" with the arc fault trip signal 38 (i.e., an "OR" function of the outputs of the GFD 30, the AFD 29, the overload detector 31 and the short delay detector 32), such that the combination of the various output signals, such as 38,40, forms a fault protection trip signal 41.

Under normal operation, the trip signal 41 passes through the µP 27 to its output 42 to turn the SCR 37 on, energize the trip solenoid 39 and, thereby, actuate the operating mechanism 19 to open the separable contacts 17 in response to the arc fault, ground fault or other trip condition. The trip solenoid 39 is, thus, a trip actuator cooperating with the µP 27 and the operating mechanism 19 to trip open the separable contacts 17 responsive to one of the different trip conditions from the µP 27. A resistor 43 in series with the coil of the solenoid 39 limits the coil current and a capacitor 44 protects the gate of the SCR 37 from voltage spikes and false tripping due to noise. In this manner, the arc fault condition, the ground fault condition or other trip condition results in the interruption of electrical power independent of the others.

One or both of the AFD 29 and the GFD 30 may have a test circuit, such as 45 and 49, respectively. These circuits may be external to or internal to the µP 27, as shown. Under test operation, if the GFD 30 and/or the AFD 29 are operating properly, then they generate the trip signals 40 and 38 when the corresponding one of the test circuits 49,45, respectively, is enabled. The test circuit 49, when enabled by the test button 9, generates a test signal to the GFD 30 to simulate a ground fault current condition by mimicking ground faults in the electrical system 11 and, thereby, testing operation of the GFD 30. The test circuit 45 may also provide signals to the AFD 29 to simulate an arc fault current condition by mimicking arc faults in the electrical system 11 and, thereby, testing operation of the AFD 29. The test circuit 45 preferably includes a low frequency relaxation oscillator and a coupling circuit for coupling a pulse signal generated by the relaxation oscillator to the AFD 29.

The bimetal 23 forms a first sensor structured to sense current flowing through the separable contacts 17. As shown in FIG. 1, the trip assembly 21 may also include a second sensor 50 structured to sense a voltage operatively associated with the separable contacts 17. In this example, the load side of the separable contacts 17 is at a common ground reference and the line-to-neutral voltage is, thus, sensed from the neutral conductor 15. As will be described, below, in connection with FIGS. 2A1, 2A2, 2B and 2C, the µC 29 includes the suitable NV memory 51, and the µP 27 is structured to save in and retrieve from such NV memory cause-of-trip information for the different trip conditions.

FIGS. 2A1, 2A2, 2B and 2C are flowcharts of a routine 100 executed by the µP 27 of FIG. 1. After power-up, at 102, the µP 27 resets and starts a µC timer 103 (FIG. 1), at 104. Next, at 106, it is determined if a suitable time (e.g., without limitation, one second) has elapsed since the timer 103 was started. If not, then, at 108, it is determined whether a periodic voltage zero-crossing signal has occurred as detected through sensor 50. The µP 27 inputs the voltage from the sensor 50 and normally receives the periodic signal (e.g., without limitation, a zero-crossing signal of the line-to-neutral voltage) therefrom. If not, then step 106 is repeated. On the other hand, if a periodic voltage zero-crossing signal has occurred, then normal start-up processing begins at 144 of FIG. 2B.

Figure 3:
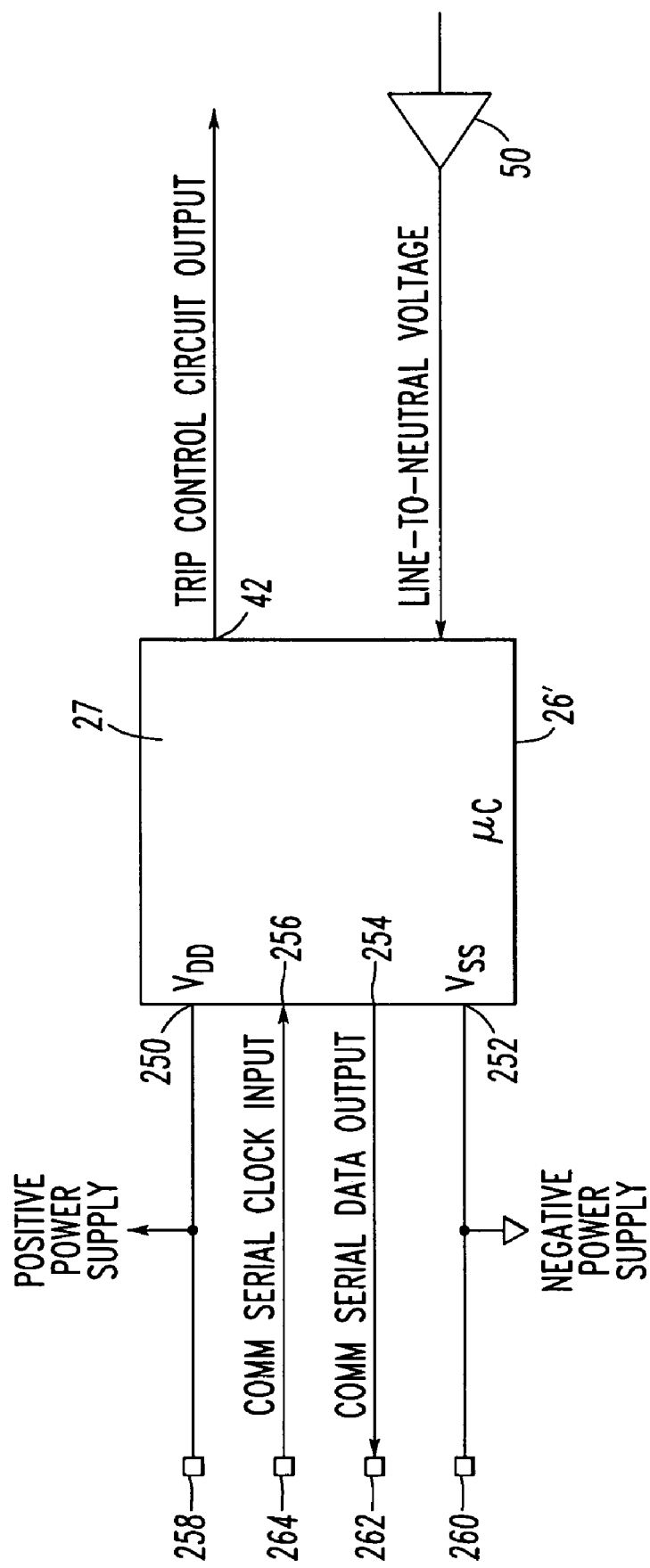
FIG. 3 is a block diagram of a processor for the circuit breaker of FIG. 1 in accordance with another embodiment of the invention.

If, at 106, a suitable time has elapsed since the timer 103 was started, then, at 110, a byte pointer and a bit pointer are both set to one. Even steps 110-142 provide a mechanism to read-out diagnostic information from the NV memory 51 when the circuit breaker 1 is powered in the manner as will be described, below, in connection with FIG. 3, and is not powered through a power supply (not shown) by the line-to-neutral voltage from the line terminal 5 and the neutral terminal 6. As such, the µP 27 retrieves the cause-of-trip information from the NV memory 51 when it determines that it is powered for a predetermined time without receipt of the periodic signal from the line-to-neutral voltage. Then, the µP 27 outputs the cause-of-trip information from the NV memory 51 on the COMM serial data output 254 (FIG. 3) responsive to the COMM serial clock input 256 (FIG. 3).

Table 1, below, shows an example structure of a portion of the NV memory 51. Of interest, one of the single stored bytes contains a cause-of-trip code in the upper nibble thereof that records the type of trip condition, while the lower nibble thereof records the peak current (divided by 20) at the time of trip. Alternatively, the meaning of the information stored in the lower nibble may differ based upon the specific trip or test condition as indicated by the upper nibble. As is discussed, below, the single byte is stored in the first cause-of-trip location of Table 1 when the circuit breaker 1 trips. Later, when the circuit breaker 1 powers on, the circuit breaker µP 27 processes the cause-of-trip information into a relatively more detailed trip record. The various cause-of-trip information further includes a count of arc fault trips corresponding to arc fault trip conditions, a count of ground fault trips corresponding to ground fault trip conditions, a count of short delay trips corresponding to short delay trip conditions, and a count of overload trips corresponding to overload trip conditions.

TABLE 1

| |
|---|
| Firmware code version (byte 1) |
| Firmware code version (byte 2) |
| Date code (byte 1) |
| Date code (byte 2) |
| Date code (byte 3) |
| Failure code |
| Cause-of-trip code        (peak current)/20 |
| Last Cause-of-trip code        (peak current)/20 |
| GF counter (byte 1) |
| GF counter (byte 2) |
| Short delay counter (byte 1) |
| Short delay counter (byte 2) |
| AF counter (byte 1) |
| AF counter (byte 2) |
| Overload counter (byte 1) |
| Overload counter (byte 2) |
| Test button counter (byte 1) |
| Test button counter (byte 2) |
| ... |
| Test button counter (byte 20) |

The µP 27 is operatively associated with a firmware code version level, which is stored in two bytes, and a manufacture date code for the trip assembly 21, which is stored in three bytes of the NV memory 51. Alternatively, or in addition, the NV memory 51 may include analog offset information (not shown) for the analog-to-digital converter (ADC) of the µC 26. The NV memory 51 also saves in two bytes different values (e.g., 255×2=510 possible maximum trips) for the count of trips corresponding to the ground fault trip condition, the short delay trip condition, the arc fault trip condition and the overload trip condition. The NV memory 51 further saves in twenty bytes the value (e.g., 255×20=5100 possible maximum trips) for the count of test trip conditions. The NV memory 51 may also include a failure code (one byte) for non-recoverable hardware faults, which are distinct from system fault conditions like, for example, ground faults or arc faults. Additional information, such as the count of ON/OFF cycles (not shown) and the "line voltage" (not shown) may also be stored, as needed, in the NV memory 51.

Next, at 112 of FIG. 2A1, the trip signal 41 is output by the µP 27. This step, which is periodically executed when the COMM serial clock input 256 is low, periodically actuates the trip solenoid 39 when the µP 27 is powered for a predetermined time without receipt of the periodic line-to-neutral voltage. This is either a safety precaution in the event that the line terminal 5 might be energized, or, alternatively, provides a "heartbeat" signal to indicate that the µP 27 is running. At 114, it is determined whether a low-to-high transition occurred on the COMM serial clock input 256 (FIG. 3). If not, then step 112 is repeated such that the trip signal 41 is periodically output. Otherwise, if the low-to-high transition occurred, then, at 116, the µC timer 103 is reset and started.

Next, at 118, the bit designated by the combination "byte pointer:bit pointer" of step 110 is output on the COMM serial data output 254 (FIG. 3). Next, at 120, it is determined whether a high-to-low transition occurred on the COMM serial clock input 256 (FIG. 3). If not, then, at 122, it is determined if a suitable time (e.g., without limitation, one second) elapsed since the timer 103 was reset. If not, then step 120 is repeated. If so, then step 110 is repeated since the diagnostic information from the NV memory 51 was improperly read-out. As such, the µP 27 repeats retrieval of the cause-of-trip information from the NV memory 51 and outputs the same on the COMM serial data output 254 responsive to the COMM serial clock input 256 being static for a predetermined time.

Otherwise, in response to the high-to-low transition on the COMM serial clock input 256, at step 124, the µC timer 103 is reset and started. Next, at 126, the bit pointer is incremented. At 128, if the bit pointer is greater than 8, then, at 130, the bit pointer is set to 1 and, at 132, the byte pointer is incremented. Otherwise, at 128, if the bit pointer is not greater than 8, or after 132, then, at 134, it is determined if the byte pointer is greater than 28. If so, then a "failure code" in the NV memory 51 is cleared before entering an endless loop at 142. On the other hand, if the byte pointer is not greater than 28, at 134, then, at 136, it is determined whether a low-to-high transition occurred on the COMM serial clock input 256 (FIG. 3). If so, then step 116 is repeated. Otherwise, at 138, it is determined if a suitable time (e.g., without limitation, one second) elapsed since the timer 103 was started. If not, then step 136 is repeated. If so, then step 110 is repeated.

Figure 2B:
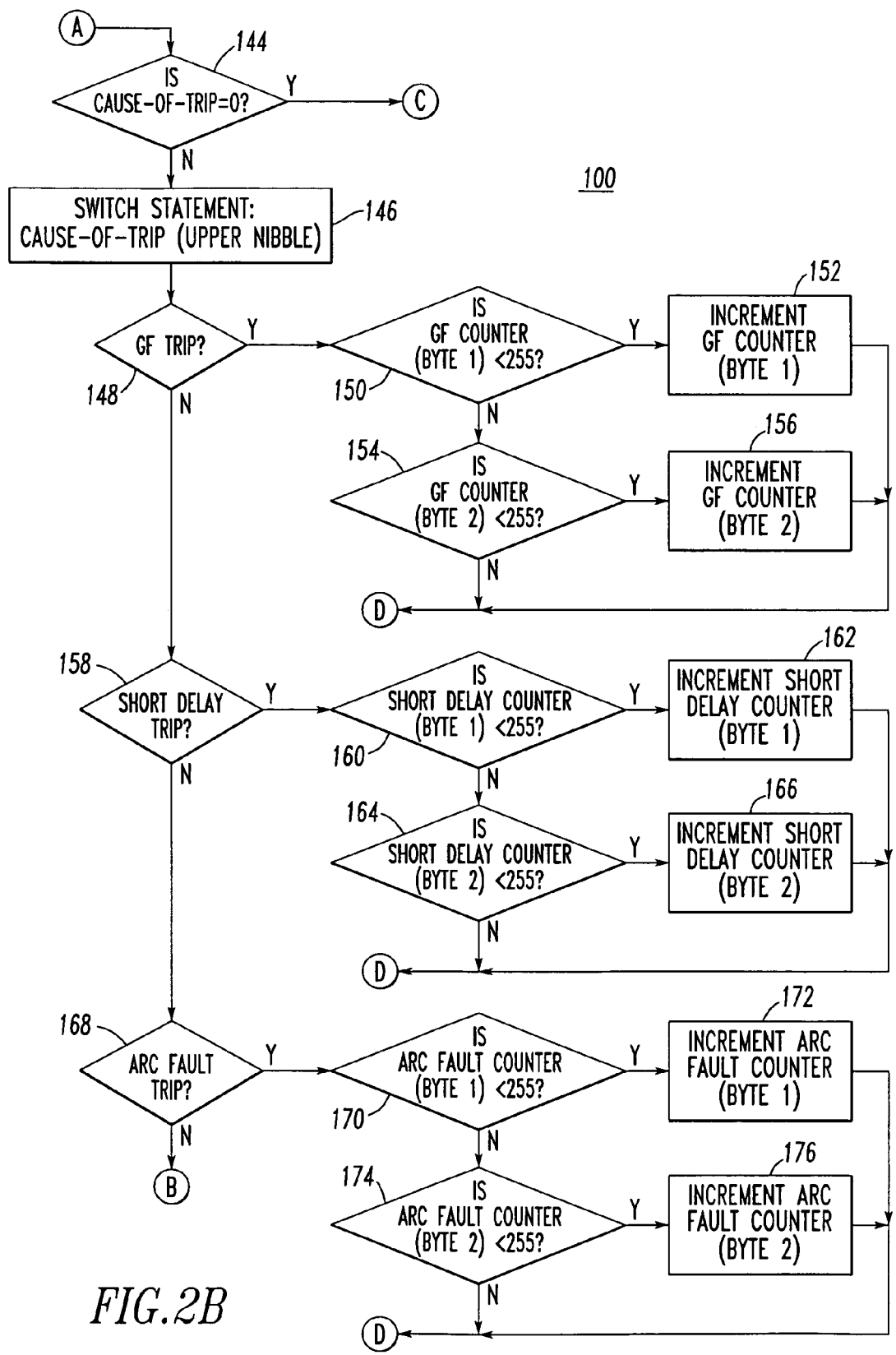

At 144 of FIG. 2B, it is determined if the cause-of-trip from the NV memory 51 is zero. If so, then normal circuit breaker processing begins at step 192 of FIG. 2C. Otherwise, the circuit breaker 1 was previously tripped, and after power-up, even steps 146-186 of FIGS. 2B-2C determine the type of the trip condition and increment the corresponding counter in NV memory 51 for the count of arc fault trips, the count of ground fault trips, the count of overload trips and the count of short delay trips based upon one of the arc fault trip code, the ground fault trip code, the overload trip code and the short delay trip code in NV memory 51. If the upper nibble of the cause-of-trip byte is non-zero at power-up, then an NV byte associated with that "cause-of-trip" is incremented (unless all associated bytes are saturated), the "cause-of-trip" byte is written into the "last cause-of-trip" NV byte (if it is a protective trip) and the cause-of-trip byte is cleared to zero. However, a test button trip counter is incremented (at 204 of FIG. 2C) before a trip is initiated. Each "cause-of-trip" has two or more NV bytes for recording the count of those trips. Each byte saturates at 255 and ceases to be updated.

At 146, the upper nibble of the cause-of-trip byte is extracted and includes one of the following different cause-of-trip codes: (0) no trip cause; (1) ground fault trip; (2) short delay trip; (3) arc fault trip; (4) overload trip; and (5-15) any other suitable trip/condition code. At 148, if the code is 1 for a ground fault trip, then even steps 150-156 update the corresponding GF counter. At 150, if the first byte of the GF counter is less than 255, then the first byte of the GF counter is incremented at 152. Otherwise, at 154, if the second byte of the GF counter is less than 255, then the second byte of the GF counter is incremented at 156. After either 152 or 156, execution resumes at 188 of FIG. 2C.

At 158, if the code is 2 for a short delay (SD) trip, then even steps 160-166 update the corresponding SD counter. At 160, if the first byte of the SD counter is less than 255, then the first byte of the SD counter is incremented at 162. Otherwise, at 164, if the second byte of the SD counter is less than 255, then the second byte of the SD counter is incremented at 166. After either 162 or 166, execution resumes at 188 of FIG. 2C.

At 168, if the code is 3 for an arc fault (AF) trip, then even steps 170-176 update the corresponding AF counter. At 170, if the first byte of the AF counter is less than 255, then the first byte of the AF counter is incremented at 172. Otherwise, at 174, if the second byte of the AF counter is less than 255, then the second byte of the AF counter is incremented at 176. After either 172 or 176, execution resumes at 188 of FIG. 2C.

Figure 2C:
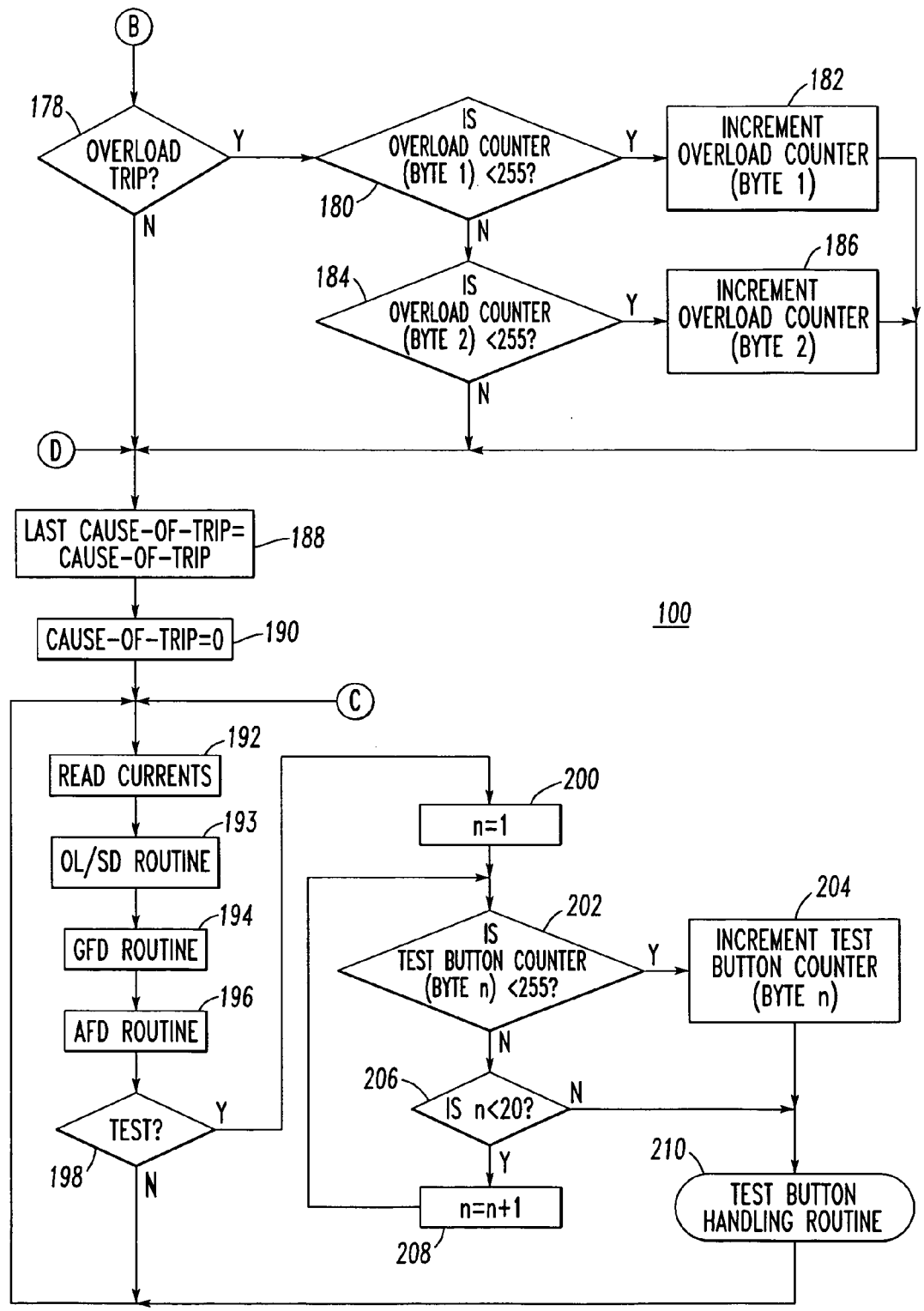

At 178 of FIG. 2C, if the code is 4 for an overload trip, then even steps 180-186 update the corresponding overload counter. At 180, if the first byte of the overload counter is less than 255, then the first byte of the overload counter is incremented at 182. Otherwise, at 184, if the second byte of the overload counter is less than 255, then the second byte of the overload counter is incremented at 186. After either 182 or 186, execution resumes at 188 where the NV last cause-of-trip is set equal to the cause-of-trip. Then, at 190, the cause-of-trip is set equal to zero.

At 192, the µP 27 reads the various current values as sensed by the bimetal 23 and the sensing coils 34,35 (FIG. 1). Steps 193, 194 and 196 respectively provide an overload (OL)/short delay (SD) routine, a GFD routine and an AFD routine. During each of these routines, the µP 27 determines if a trip current corresponds to one of the overload or short delay trip condition, the ground fault trip condition and the arc fault trip condition, and, if so, saves in and retrieves from the NV memory 51 the trip current as part of the cause-of-trip information.

Next, at 198, it is determined if the test pushbutton 9 (FIG. 1) is depressed. If so, then even steps 200-208 update the corresponding test counter in NV memory 51. At 200, an integer n is set to 1. At 202, it is determined if the test byte counter (byte n) is less than 255. If so, then at 204, the corresponding test byte (byte n) counter is incremented after which execution resumes at 210. Here, the count of trips corresponding to the test trip condition is incremented before the µP 27 actuates the trip solenoid 39.

Otherwise, at 202, if the corresponding test byte (byte n) counter is not less than 255, then at 206, it is determined if the integer n is less than 20. If not, then execution resumes at 210. Otherwise, if the integer n is less than 20, then the integer n is incremented, at 208, and execution resumes at 202.

Step 210 processes the test pushbutton 9, which may provide one or two inputs for the corresponding ground fault test circuit 49 and the arc fault test circuit 45. In turn, the µP 27 actuates the trip solenoid 39 to trip open the separable contacts 17 responsive to actuation of the test button 9.

Upon tripping in any of steps 193, 194, 196, 210, protective "cause-of-trip" or test button trip information is saved in the upper nibble of the cause-of-trip byte in NV memory 51 (Table 1) and the peak current at tripping (divided by 20) is saved in the lower nibble of that cause-of-trip byte. When multiplied by 20 A, the lower nibble saturates at 15 counts or 300 A. The upper nibble of the cause-of-trip byte includes one of the following different cause-of-trip codes: (0) no trip cause; (1) ground fault trip; (2) short delay trip (e.g., without limitation, sustained high current>250 A); (3) arc fault trip; (4) overload trip; and (5-15) any other suitable trip/condition code.

After the circuit breaker 1 issues a trip request, but before the circuit breaker electronic trip assembly 21 loses power, there is some opportunity to store information about the trip cause in NV memory 51. For example, the worst case time to store information in NV memory 51 may be on the order of about 10 mS. In this example, there is sufficient time to store only minimal information. This example stores a single byte of cause-of-trip information, although any suitable count of bytes may be stored as time permits.

FIG. 3 shows µC 26' which may be the same as or similar to the µC 26 of FIG. 1. The µC 26' includes a first power supply voltage input ($V_{DD}$) 250, a second power supply voltage input ($V_{SS}$) 252, a COMM serial data output 254 and a COMM serial clock input 256. The trip assembly 21 (FIG. 1) includes a first terminal 258 corresponding to the first power supply voltage input 250, a second terminal 260 corresponding to the second power supply voltage input 252, a third terminal 262 corresponding to the COMM serial data output 254 and a fourth terminal 264 corresponding to the COMM serial clock input 256. The terminals 258,260,262,264 may be, for example, printed circuit board pads (not shown) that can be electrically engaged by a suitable diagnostic circuit (not shown) that provides power to the power supply voltage inputs 250,252, a suitable clock to the COMM serial clock input 256 and receives the data from the COMM serial data output 254.

Under normal operation of the circuit breaker 1 (FIG. 1), the μP 27 receives a periodic line-to-neutral voltage zero-crossing signal from sensor 50 during powered operation. As was discussed above in connection with FIGS. 2A1-2A2, if the circuit breaker 1 is powered for about 1 second without the periodic line-to-neutral voltage zero-crossing signal, then the μP 27 assumes it is in an interrogation mode, periodically sends the trip signal 41 to the trip solenoid 39 and monitors the COMM serial clock input 256. When a low-to-high "clock" transition is detected, NV byte information is serially downloaded, least significant bit first, at a maximum rate of about 1000 bits per second. If the clock is static high or low for one second, then the NV byte pointer returns to the first NV byte. If communication of all NV bytes is successful, then the cause of failure byte is cleared and writes to NV memory 51 are inhibited (at step 142 of FIG. 2A2) until a power down reset occurs.

The example miniature residential circuit breaker 1 includes a microprocessor-controlled protection circuit as part of the μC 26. The μP 27 generates a trip, for example, in response to arc fault conditions, ground fault conditions, overload and/or short delay trip conditions. The cause-of-trip data and trip current level are stored at the time of trip in NV memory 51. Furthermore, four terminals 258,260,262,264 (e.g., printed circuit board pad connections) are provided such that when the circuit breaker 1 is returned to the manufacturer, the μP 27 can be interrogated to extract meaningful trip information.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit interrupter comprising:
   separable contacts;
   an operating mechanism structured to open and close said separable contacts; and
   a trip mechanism comprising:
   a sensor structured to sense current flowing through said separable contacts,
   a processor cooperating with said sensor to determine a plurality of different trip conditions responsive to said sensed current,
   a nonvolatile memory operatively associated with said processor, and
   a trip actuator cooperating with said processor and said operating mechanism to trip open said separable contacts responsive to one of said different trip conditions from said processor,
   wherein said processor is structured to save in and retrieve from said nonvolatile memory cause-of-trip information for said different trip conditions including said one of said different trip conditions,
   wherein said cause-of-trip information for said one of said different trip conditions includes a corresponding cause-of-trip code of a plurality of different cause-of-trip codes corresponding to said different trip conditions, and
   wherein said corresponding cause-of-trip code is not a trip current.

2. The circuit interrupter of claim 1 wherein said circuit interrupter is one of a miniature circuit breaker and a residential circuit breaker.

3. The circuit interrupter of claim 1 wherein said processor is a microprocessor.

4. The circuit interrupter of claim 1 wherein said different trip conditions include at least some of an arc fault trip condition, a ground fault trip condition and an overload trip condition; and wherein said cause-of-trip information includes one of an arc fault trip code corresponding to said arc fault trip condition, a ground fault trip code corresponding to said ground fault trip condition, and an overload trip code corresponding to said overload trip condition.

5. The circuit interrupter of claim 4 wherein said processor determines a trip current corresponding to one of said arc fault trip condition, said ground fault trip condition and said overload trip condition; and wherein said processor is further structured to save in and retrieve from said nonvolatile memory said determined trip current as part of said cause-of-trip information.

6. The circuit interrupter of claim 4 wherein said cause-of-trip information further includes a count of arc fault trips corresponding to said arc fault trip condition, a count of ground fault trips corresponding to said ground fault trip condition, and a count of overload trips corresponding to said overload trip condition.

7. The circuit interrupter of claim 6 wherein after power-up, said processor is structured to increment one of said count of arc fault trips, said count of ground fault trips and said count of overload trips based upon one of said arc fault trip code, said ground fault trip code and said overload trip code.

8. The circuit interrupter of claim 1 wherein said processor is operatively associated with a firmware code version level; and wherein said nonvolatile memory further saves said firmware code version level.

9. The circuit interrupter of claim 1 wherein said trip mechanism further comprises a test button; and wherein said processor is structured to actuate said trip actuator to trip open said separable contacts responsive to actuation of said test button.

10. The circuit interrupter of claim 9 wherein said different trip conditions include a test trip condition, an arc fault trip condition, a ground fault trip condition, a short delay trip condition and an overload trip condition; wherein said processor determines a trip corresponding to one of said test trip condition, said arc fault trip condition, said ground fault trip condition, said short delay trip condition and said overload trip condition; and wherein said cause-of-trip information further includes a count of trips for each of said test trip condition, said arc fault trip condition, said ground fault trip condition, said short delay trip condition and said overload trip condition.

11. The circuit interrupter of claim 10 wherein said count of trips corresponding to said test trip condition is incremented before said processor actuates said trip actuator to trip open said separable contacts responsive to actuation of said test button.

12. The circuit interrupter of claim 10 wherein said nonvolatile memory is structured to save a first value for said count of trips corresponding to said test trip condition, and a second value for one of said count of trips for said arc fault trip condition, said ground fault trip condition, said short delay trip condition and said overload trip condition; and wherein said first value is greater than said second value.

13. A circuit breaker comprising:
separable contacts;
an operating mechanism structured to open and close said separable contacts; and
a trip mechanism comprising:
  a first sensor structured to sense current flowing through said separable contacts,
  a second sensor structured to sense a voltage operatively associated with said separable contacts,
  a processor cooperating with said first sensor to determine a plurality of different trip conditions responsive to said sensed current,
  a nonvolatile memory operatively associated with said processor, and
  a trip actuator cooperating with said processor and said operating mechanism to trip open said separable contacts responsive to one of said different trip conditions from said processor,
  wherein said processor is structured to save in and retrieve from said nonvolatile memory cause-of-trip information for said different trip conditions including said one of said different trip conditions,
  wherein said cause-of-trip information for said one of said different trip conditions includes a corresponding cause-of-trip code of a plurality of different cause-of-trip codes corresponding to said different trip conditions, and
  wherein said corresponding cause-of-trip code is not a trip current.

14. The circuit breaker of claim 13 wherein said processor includes a first power supply voltage input, a second power supply voltage input, a serial data output and a serial clock input; and wherein said trip mechanism further comprises a first terminal corresponding to said first power supply voltage input, a second terminal corresponding to said second power supply voltage input, a third terminal corresponding to said serial data output and a fourth terminal corresponding to said serial clock input.

15. The circuit breaker of claim 14 wherein said processor is structured to retrieve said cause-of-trip information including said corresponding cause-of-trip code from said nonvolatile memory and output the same on said serial data output responsive to said serial clock input.

16. The circuit breaker of claim 15 wherein said processor is structured to input said voltage from said second sensor and receive a periodic signal therefrom; and wherein said processor is further structured to retrieve said cause-of-trip information including said corresponding cause-of-trip code from said nonvolatile memory when said processor is powered for a predetermined time without receipt of said periodic signal.

17. The circuit breaker of claim 16 wherein said periodic signal is a zero-crossing signal of said voltage.

18. The circuit breaker of claim 16 wherein said predetermined time is about one second.

19. The circuit breaker of claim 14 wherein said processor is structured to input said voltage from said second sensor and receive a periodic signal therefrom; and wherein said processor is further structured to periodically actuate said trip actuator when said processor is powered for a predetermined time without receipt of said periodic signal.

20. The circuit breaker of claim 14 wherein said processor is structured to repeat retrieval of said cause-of-trip information including said corresponding cause-of-trip code from said nonvolatile memory and output the same on said serial data output responsive to said serial clock input being static for a predetermined time.

* * * * *